Figure 3A:
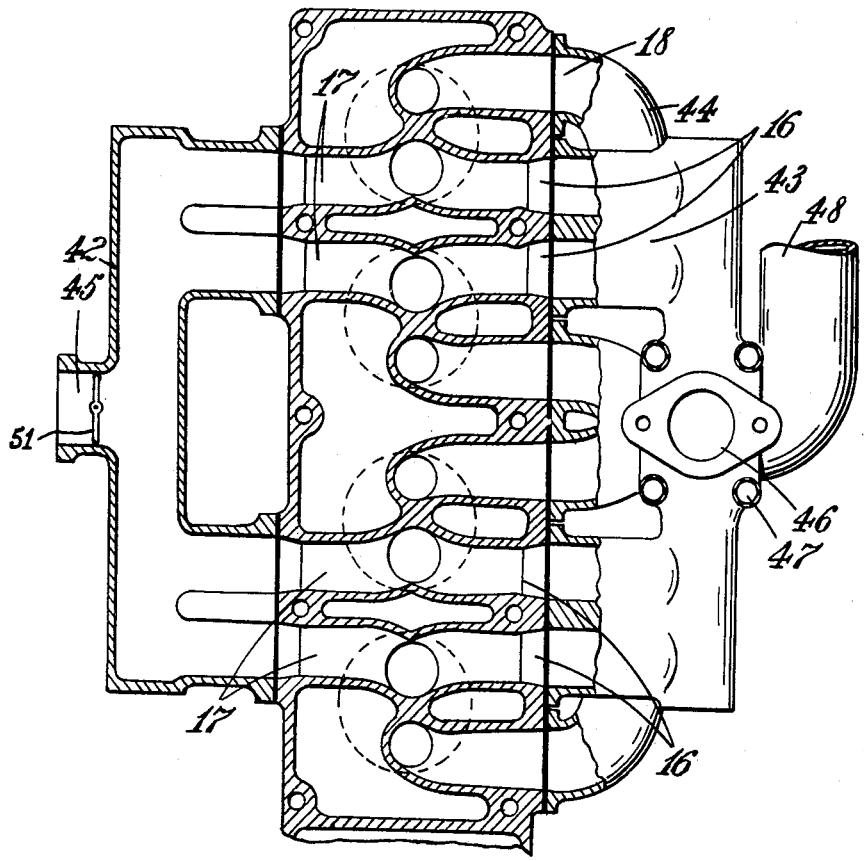

Oct. 18, 1960            H. WESLAKE            2,956,556
INLET PASSAGES FOR INTERNAL COMBUSTION ENGINES
Filed April 18, 1955            4 Sheets-Sheet 1
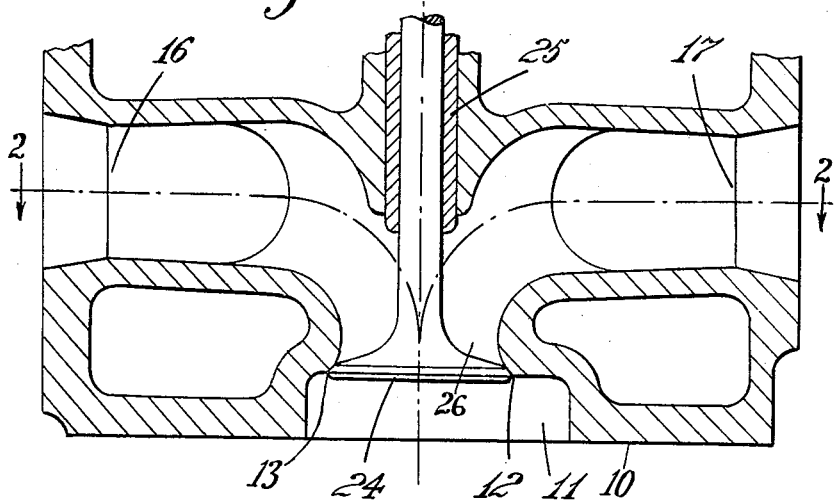
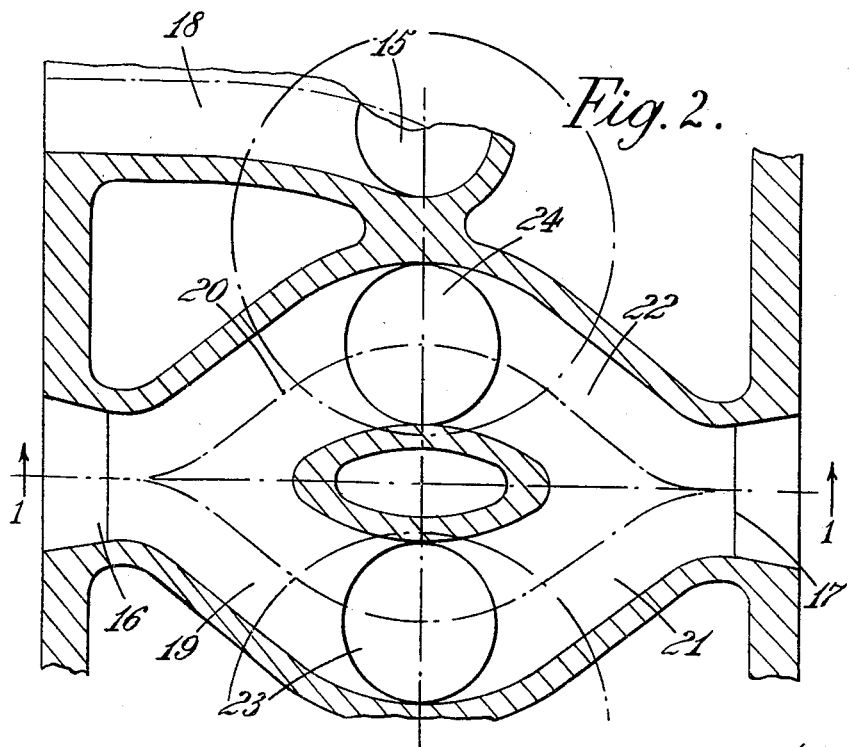
INVENTOR
HENRY WESLAKE
By Young, Emery & Thompson
ATTYS.

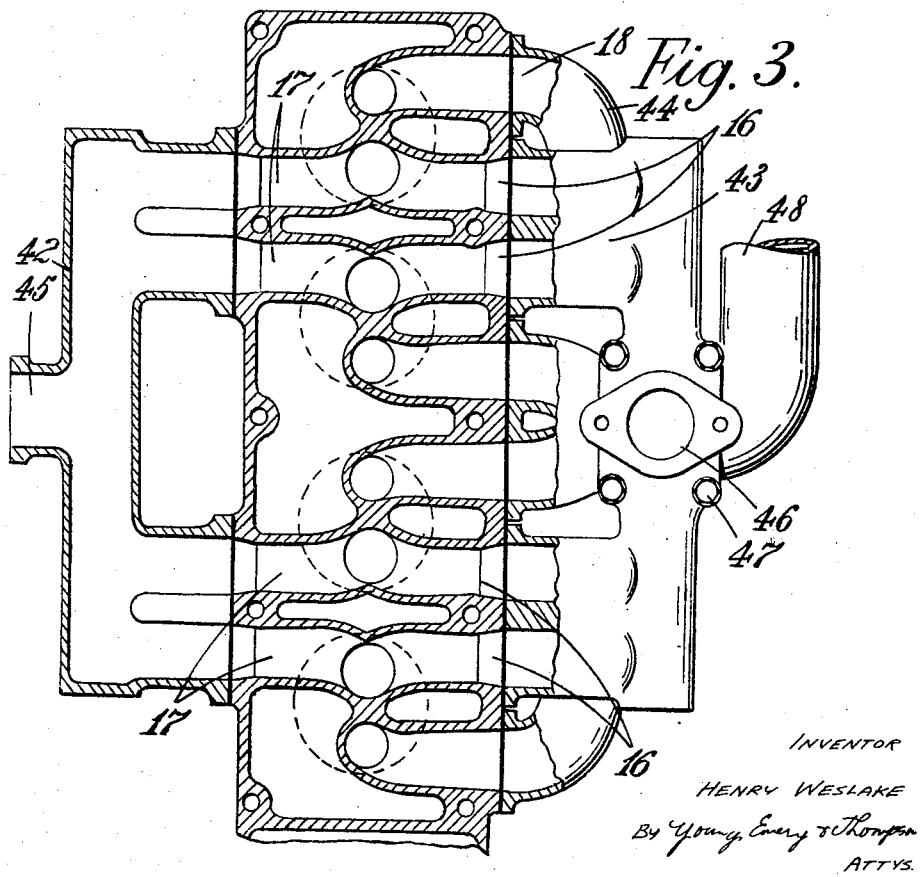

Oct. 18, 1960

H. WESLAKE 2,956,556

INLET PASSAGES FOR INTERNAL COMBUSTION ENGINES

Filed April 18, 1955

4 Sheets-Sheet 4

INVENTOR
HENRY WESLAKE
By Young, Emery & Thompson
ATTYS.

2,956,556

INLET PASSAGES FOR INTERNAL COMBUSTION ENGINES

Henry Weslake, Harbour Road, Rye Harbour, Sussex, England

Filed Apr. 18, 1955, Ser. No. 502,140

4 Claims. (Cl. 123—52)

This invention relates to inlet passages for internal combustion engines, and has for an object to improve the volumetric efficiency of the engine i.e. to increase the amount of combustible charge which can be introduced into the engine cylinders and thus increase the power of the engine.

According to this invention an internal combustion engine is characterised in that each inlet port is fed by at least two inlet passages.

Preferably two inlet passages join one another at or close to the inlet valve seat.

Those ends of the passages which are adjacent to the valve seat may be directed towards one another so that the two streams of gases flowing from the passages merge with one another and intermingle.

In the case where a cylinder head is formed with a flat topped combustion chamber, the inlet port is arranged in the flat top and the two passages feeding the inlet port extend towards the inlet port from opposite sides of the cylinder head and in an inclined manner towards the mould of the combustion chamber.

Preferably the passages are free of any rapid changes in direction or pronounced inflection.

A valve guide may extend between two inlet passages where they join the space immediately adjacent the valve seat.

The valve guide may be shaped so as to promote swirl of the two streams on entry into the combustion chamber. For example, the outer surface could be provided with suitably shaped ribs or vanes.

In any of the arrangements referred to above arranged for a multi cylinder internal combustion engine, one of the passages in each cylinder head is connected to one manifold pipe and the other passage in each cylinder head is connected to a second manifold pipe. One of the pipes may be so located in relation to the exhaust system that the combustible mixture in that manifold pipe is heated to an appropriate extent for the conditions when the engine is not required to be run under full load, whereas the other manifold pipe is not heated and throttle valves associated with the two manifold pipes may be so controlled that the second manifold pipe comes into action providing a cold mixture under full load running conditions which lowers the temperature of the combustible gas provided by the first said manifold pipe and thus prevents detonation and loss of volumetric efficiency.

Figure 4:
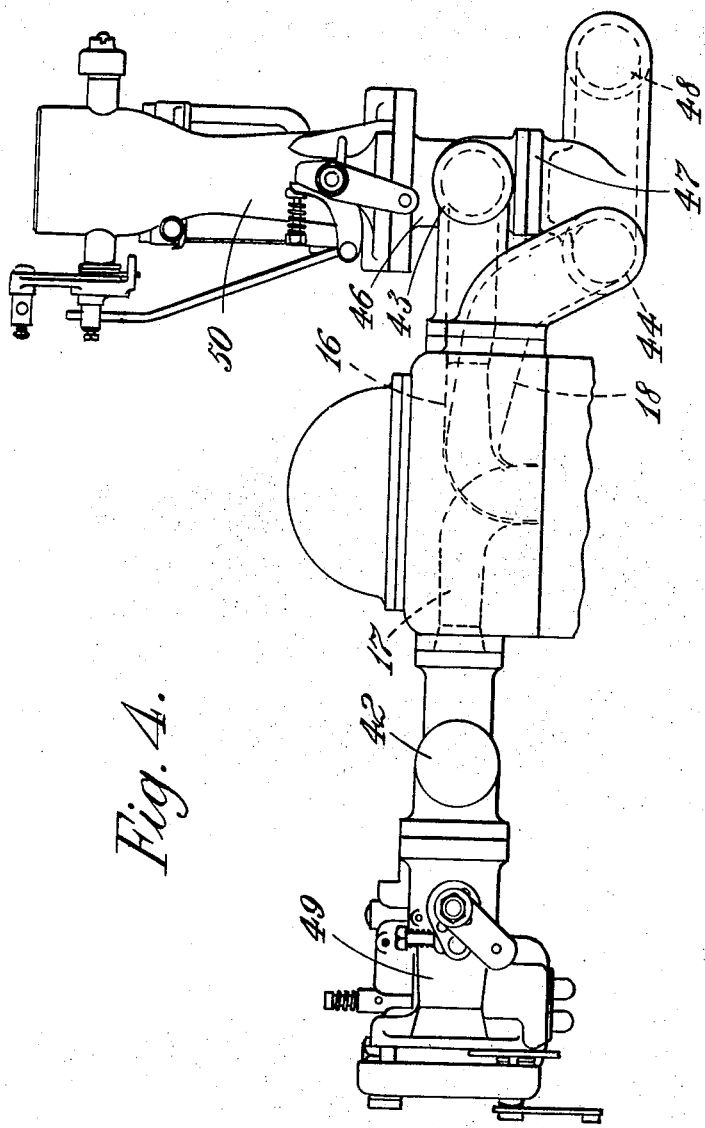

The following is a description of a number of embodiments of the invention reference being made to the accompanying drawings in which:

Figure 1 is a section on the line 1—1 of Figure 2, through a cylinder head in a plane parallel to and opposite from the axis of the cylinder, Figure 2 is a section on the line 2—2 of Figure 1, of a part of the cylinder head over two cylinders and showing the arrangement supplied to what is known as "Siamese" inlet ports, Figures 3, 3a are a part sectional plan view of a cylinder head for a multi-cylinder combustion engine showing the arrangement of the inlet and exhaust manifold, and Figure 4 is an end elevation of the cylinder head shown in Figures 3 and 3a.

In the arrangement of Figures 1 and 2, the invention is shown applied to a cylinder head 10 having a combustion chamber 11 with a flat roof 12 in which are formed an inlet port 13 and exhaust port (not shown) which ports are controlled by inlet valves 23 and 24 and exhaust valve 15 so disposed as to lie over the engine cylinder. As will be seen from Figure 2, the inlet port is fed by passages 16 and 17 both of venturi shape and extending on opposite sides of the valve port. The axes of the two passages 16 and 17 as viewed in plan are slightly curved so as to be inclined in relation to one another where they meet the port. Two streams of gases are directed towards one side of the valve stem entries, creating considerable turbulence and swirl where they meet. As viewed in Figure 1 the passages 16 and 17 merge with one another in curves. An exhaust passage 18 is disposed on the same side of the cylinder head as the inlet passage 16 and is spaced therefrom.

A valve guide 25 is provided for the inlet valve 24 and extends between the two inlet passages where they join the space 26 over the valve seat.

Figures 1 and 2 show more particularly the invention as applied to "Siamese" inlet ports controlled by inlet valves 23 and 24 for two adjacent cylinders. The exhaust valve 15 is shown for only one cylinder. In this case the inlet passage 16 is divided into two parts 19 and 20 which feed the two valves on one side thereof and the inlet passage 17 is divided into two parts 21 and 22 which feed the two valves on the opposite sides thereof. A single exhaust valve 15 is provided for each cylinder controlling the exhaust passage 18.

In the case of a multi-cylinder internal combustion engine, it will be appreciated with any of the arrangements referred to above there will be a number of inlet passages extending to opposite sides of the cylinder head. Various carburettor arrangements may be provided. For example, each passage may be fed with a separate carburettor, such an arrangement might be practicable for a four-cylinder engine. Alternatively, a single induction manifold pipe may be arranged on each side of the cylinder head and may be fed with one or more carburettors. Alternatively, there may be provided on each side of the cylinder head, a number of manifold pipes, each fed by a separate carburettor and feeding a number of passages in the cylinder head.

In yet a further arrangement, the inlet passages on one side of the cylinder head may communicate with a manifold pipe which is not connected to a carburettor and is sealed to the atmosphere. Such an arrangement is particularly applicable where a number of carburettors on the opposite side of the cylinder head separately feed manifold pipes communicating with different inlet passages in the cylinder head. With this arrangement assuming that the inlet valve is closed in one cylinder, nevertheless the carburettor connected to the particular passage feeding the valve can supply mixture through the passage on the opposite side of the cylinder and through the sealed manifold pipe to a cylinder in which a valve is open. This principle is also applicable to a Siamese arrangement shown in Figure 2. Assuming that arrangement is applied to a four cylinder engine, there will be two inlet passages 16 opening into one side of the cylinder head and two inlet passages 17 opening into the other side of the cylinder head. A carburettor may be associated with each of the passages 16 whereas the two passages 17 can be connected together by a short circuiting pipe. A more conventional arrangement of manifold pipe is shown in Figures 3, 3a and 4 which is applicable to the constructions of Figures 1 and 2. The exhaust passages are on the opposite side of the cylinder head to that shown in Figures 1 and 2. The passages 17 on one side of the cylinder head all communicate with the inlet manifold 42, whereas the inlet passages 16 on the other side of the cylinder head communicate with an inlet manifold 43. This inlet manifold is disposed above an exhaust manifold 44 which is fed by the exhaust passages 18 and is provided with a main outlet passage 48. The inlet manifold 42 is provided with a laterally extending branch 45 to which is attached a carburettor 49 whereas the inlet manifold 43 is provided with an upwardly extending branch 46 to which is attached another carburettor 50. The inlet manifold 43 and exhaust manifold 44 are arranged to be in close thermal contact at the centers of their lengths and are bolted together at 47 so as to provide a hot spot.

In the case where the inlet manifold 42 is not provided with a carburettor, it may be blanked off, as indicated by valve 51 (Fig. 3a), so that the manifold becomes the aforesaid short-circuiting pipe for the two passages 17.

In any of the arrangements referred to above where separate manifolds are provided on opposite sides of the cylinder head, two separate fuel systems may be provided, one for low grade fuel such as tractor vaporising oil or paraffin which is used in conjunction with the manifold pipe which is heated by the exhaust system, and a higher grade fuel or alcohol mixture for use with the manifold pipe supplying the cold mixture.

For engines used for racing motor cars the carburettors associated with the two manifold pipes are controlled by separate throttle valves which result in combustible mixture being supplied to one manifold pipe before the other.

For long distance racing ordinary hydro-carbon fuel can be suplpied to one manifold pipe while under full throttle conditions the other manifold pipe supplies an alcohol mixture fed either by a carburettor or by an injection system.

In an alternative arrangement the two manifold pipes may be fed with combustible mixtures of different strengths or one of them may be fed with air and the other with a rich mixture. As in the previous arrangement the manifold pipes may be controlled by separate throttle valves.

The throttle valves may be so interlinked that the throttle valve controlling the richer mixture opens first and is then followed by the opening of the throttle valve controlling the weaker mixture of air. If desired the two passages may be of different sizes.

In any of the arrangements referred to above, a super charger may be associated with either or both manifold pipes.

The invention is applicable to both four stroke cycle engines and to two stroke cycle engines, and particularly to a two stroke diesel engine which is highly super-charged and used to provide the heated charge to drive a gas turbine.

I claim:
1. A multi-cylinder internal combustion engine having a cylinder head formed with inlet ports for the engine cylinders, wherein passages are provided for feeding gases to the inlet ports of two adjacent cylinders from one side of the cylinder head, and wherein another passage which is sealed from the atmosphere is provided on the other side of the cylinder head, with which other passage the first said passages communicate.

2. A multi-cylinder internal combustion engine having a cylinder head formed with inlet ports for the engine cylinders, wherein passages are provided for feeding gases to the inlet ports of two adjacent cylinders from one side of the cylinder head and wherein there is provided on the other side of the cylinder head an external manifold pipe which is sealed from the atmosphere, with which pipe the said passages communicate.

3. A multi-cylinder internal combustion engine having a cylinder head formed with inlet ports for the engine cylinders wherein passages are provided for feeding gases to the inlet ports from one side of the cylinder head, and wherein there is provided on the other side of the cylinder head an external manifold pipe which extends along the length of the engine and is sealed from the atmosphere, with which pipe the said passages communicate.

4. A cylinder head for an internal combustion engine having a combustion chamber and inlet and exhaust ports, said head having two sets of inlet passages on opposite sides thereof, an induction manifold pipe on each side of the head connected to the inlet passages on the respective side of the head, an exhaust manifold on one side of the head connected to the exhaust ports, a carburettor for supplying a combustible mixture to one of said manifold pipes, and means sealing the other manifold pipe to the atmosphere.

References Cited in the file of this patent
UNITED STATES PATENTS

| | | |
|---|---|---|
| 1,197,546 | Rogers | Sept. 5, 1916 |
| 1,231,522 | Gueret | June 26, 1917 |
| 1,318,542 | Chevrolet | Oct. 14, 1919 |
| 1,556,859 | L'Orange | Oct. 13, 1925 |
| 1,584,656 | Rudkin | May 11, 1926 |
| 1,663,035 | Asbury | Mar. 20, 1928 |
| 1,894,667 | Church et al. | Jan. 17, 1933 |
| 1,966,671 | Kramer | July 17, 1934 |
| 2,108,740 | Belford | Feb. 15, 1938 |
| 2,244,214 | Pescara | June 3, 1941 |
| 2,318,914 | Anderson et al. | May 11, 1943 |
| 2,466,181 | Myrick | Apr. 5, 1949 |
| 2,740,392 | Hollingsworth | Apr. 3, 1956 |
| 2,804,862 | Nedwidek | Sept. 3, 1957 |

FOREIGN PATENTS

| | | |
|---|---|---|
| 995,885 | France | Dec. 10, 1951 |